United States Patent
Jin et al.

(12) 
(10) Patent No.: US 6,788,553 B1
(45) Date of Patent: Sep. 7, 2004

(54) SWITCHING-MODE POWER CONVERTER WITH COMPLEMENTARY SYNCHRONOUS RECTIFICATION

(75) Inventors: Xiao Ping Jin, Singapore (SG); Jian Ping Fan, Singapore (SG)

(73) Assignee: Broadband Telcom Power, Inc., Santa Ana, CA (US)

( * ) Notice: Subject to any disclaimer, the term of this patent is extended or adjusted under 35 U.S.C. 154(b) by 117 days.

(21) Appl. No.: 09/683,439

(22) Filed: Dec. 28, 2001

(51) Int. Cl.[7] .............................................. H02M 3/335
(52) U.S. Cl. .............................. 363/21.06; 363/21.14; 363/126
(58) Field of Search .............................. 363/16, 17, 20, 363/21.01, 21.06, 21.14, 24, 25, 26, 127

(56) References Cited

U.S. PATENT DOCUMENTS 5,742,491 A  *  4/1998  Bowman et al. ......... 363/21.06

6,618,274 B2  *  9/2003  Boylan et al. ................. 363/17

* cited by examiner

Primary Examiner—Jessica Han
(74) Attorney, Agent, or Firm—Kam T. Tam

(57) ABSTRACT

A switching-mode power converter includes input and output circuits. A transformer having primary and secondary windings which are respectively coupled to the input and output circuits. The secondary winding has two end terminals respectively connected to first and second switches. The first and second switches are also joined together at a common node. The secondary winding also has a mid terminal. A filter circuit is disposed between the mid terminal and the common node. The first and second switches are controlled by complementary control circuits which selectively allow current to orderly pass through the filter circuit via the switches during the forward rectification, resetting, and freewheeling modes of operation of the power converter.

1 Claim, 9 Drawing Sheets

| time period, t | $v_{90}$ | $v_{92}$ | $v_{124}$ | $v_{126}$ | $v_{128}/v_{94}$ | $v_{144}$ | $v_{146}$ | $v_{148}/v_{96}$ |
|---|---|---|---|---|---|---|---|---|
| Initial | 0 to t1 | L | L | L | L | H | L | L | H |
| Forward Rectification | t1 to (t2+td) | L | H | H | H | L | L | L | H |
| Resetting | (t2+td) to (t2+td+ts) | L | L | L | L | H | H | H | L |
| Free-Wheeling | (t2+td+ts) to t3 | L | L | H | L | H | H | L | H |
| Forward Rectification | t3 to (t4+td) | H | H | L | L | H | L | H | L |
| Resetting | (t4+td) to (t4+td+ts) | H | L | H | H | L | H | L | H |
| Free-Wheeling | (t4+td+ts) to t5 | L | L | H | L | H | H | L | H |

Fig. 10

SWITCHING-MODE POWER CONVERTER WITH COMPLEMENTARY SYNCHRONOUS RECTIFICATION

BACKGROUND OF INVENTION

1. Field of the Invention

The present invention relates generally to electrical power conversion, and more particularly, to switching-mode power converters having complementary synchronous rectification.

2. Description of the Related Art

DC-to-DC power converters are commonly used to convert power from one DC level to another. FIG. 1 shows a simplified single-ended converter signified by the reference numeral 2. The converter 2 includes a transformer 4 having a core 5. There are primary and secondary windings 6 and 8 wound around the core 5. The primary winding 6 is connected to a DC power source 3 through a switch 7. Attached across the secondary winding 8 is an inductor 10 connected in series with a capacitor 12 via a rectifier 9. In this case, the rectifier 9 is a diode 14. There is also a free-wheel diode 15 connected across the secondary winding 8 as shown in FIG. 1.

The operation of the converter 2, in conjunction with some basic terms relating to rectification are herein described. Reference is now directed to FIGS. 1 and 2. Suppose the DC power source 3 supplies a DC voltage $V_{IN}$. The switch 7 is turned on and off periodically. As a consequence, a periodic step-pulse voltage $v_P$ is generated and is applied across the primary winding 6. In this specification, lower case alphabets are used to denote parameters that vary with time. For example, $v_P$ designates a time-varying voltage signal. During the first half-cycle t1 (FIG. 2), the primary voltage $v_P$ is positive, from basic electromagnetic theory, a positive secondary voltage $v_S$ is induced in the secondary winding 8. The positive-going secondary voltage $v_S$ forward biases the rectifying diode 14. Consequently, the capacitor 12 is charged via the forward-biased diode 14 through the inductor 10. The resultant current path is denoted by the reference numeral 11, as shown in FIG. 1. The converter 2 is said to be in a forward rectification mode.

At the end of the half-cycle t1, the supply voltage $v_P$ begins to switch polarities and approaches the zero potential. However, at this juncture, the stored energy in the transformer 4, such as in the windings 6 and 8, releases and sends spurred signals of opposite polarity to original voltage $v_S$. Take the secondary winding 8 as an example. The spurred signal is in the form of a spike 16 as shown in FIG. 2. Phrased differently, in accordance with Lenz's law, the sudden cessation of current supply $i_S$ in the secondary winding 8 provokes the winding 8 to generate a voltage spike 16 of opposite polarity to that of the secondary voltage $v_S$ which occurred during the forward rectification mode. However, with the spike 16 having negative polarity impinging upon the secondary winding 8, the diode 14 is reversely biased. At the same time, as is well known, inductors always maintain current continuity and attempt to sustain the original current flows. Thus, with the reverse-biased diode 14 acting as an open circuit, the stored energy in the windings 6 and 8 goes nowhere but as spurious current charging the parasitic elements in its path. The current discharge is in the form of a damped oscillation until all the stored energy is dissipated. The converter 2 is said to be in a resetting mode. The current path of the resetting mode is identified by the reference numeral 13.

In the same manner as the windings 6 and 8 of the transformer 5, at the end of the half-cycle at t=t1, the stored energy in the inductor 10 also releases itself. In this case, the discharge is through the capacitor 12 and the freewheel diode 15. The inductor 10 is normally designed with a large inductive value. The freewheeling current normally continues until the onset of the next switching cycle. The path of the freewheeling current flow is identified by the reference numeral 17 shown in FIG. 1. The converter 2 is said to be in a freewheeling mode.

Attention is now directed to the rectifier 9 in FIG. 1. The diode 9 poses considerable Ohmic drop during the forward rectification mode. In operation, the p-n junction of the diode 9 can consume approximately 0.7 Volt of voltage level. To rectify this shortfall, attempts have been made to insert a Schottky diode 18 as a replacement for the regular diode 14, as shown in FIG. 3. Still, the Schottky diode 18 can adsorb close to 0.5 Volt of voltage level.

An efficient design of the converter 2 is to have the resetting current totally discharged swiftly and efficiently with minimal disturbance to the normal operation of the entire circuit 2. A slow decay of the resetting current in comparison to the switching frequency of the switch 7 can distort the periodic waveform feeding the primary winding 6, causing the "staircase-DC-bias" effect. The staircase-DC-bias effect is to be avoided and is especially crucial in modern-day switching mode power converter with compact sizes operating at high frequencies. There is still another undesirable effect for not efficiently discharging the resetting current. Specifically, if the resetting current is discharged through a high-impedance discharge path, excessive Joule heat can be generated. The generated heat not only undercuts the power efficiency by unnecessarily consuming power as wasteful heat. Excessive heat generated, if not properly controlled, can also detrimentally effect reliability.

Modern-day converter designs require compactness, low power consumption, and efficiency. For special applications such as high-speed data communications and computing, circuits are operated at very low voltage levels yet demanding high current outputs. Too high a voltage drop consumed by the converter is undesirable and sometimes impractical. To further curtail the Ohmic drop, FETs (Field Effect Transistors) have been adopted to substitute the diodes in the rectifying circuit 9. As shown in FIG. 4, a FET 20 is disposed to take the place of the diode 14. However, the FET 20 must be controlled by a control circuit 22 to provide proper timing signals to the FET 20 such that the FET 20 turns on and off appropriately. That is, the control circuit 22 has to operate in synchronization with the timing of the switch 7 (FIG. 1). Accordingly, the rectifier 9 shown in FIG. 4 is called a synchronous rectifier, and the process is called synchronous rectification. Due to the various operating modes as mentioned above, the control circuit 22 must operate with precise timing. If the FET 20 is turned on incorrectly, a circuit short may occur. Likewise, if the FET 20 is turned off at the wrong time, a unacceptable high voltage drop may result causing significant decline in operating efficiency and overheating.

The converter 2 shown in FIG. 1 is a single-ended converter. For usage at high power levels, double-ended circuit schemes, such as push-pull, half-bridge, and full-bridge designs are common. Because of the relatively complex current traffic of the various modes of operation of the converter 2 as described above, providing a control circuit 22 with proper timing is quite elaborate. Heretofore, there has not been any practical scheme that works satisfactorily.

In light of the above, there is a need to provide efficient switching-mode power converters utilizing synchronous rectification.

SUMMARY OF INVENTION

It is accordingly the object of the invention to provide a DC-to-DC power converter with synchronous rectification that substantially optimizes current flows during the various modes of operation. It is also another object of the invention to provide such a converter at low cost and high operational efficiency.

The switching-mode power conversion circuit of the invention includes input and output circuits. A transformer having primary and secondary windings which are respectively coupled to the input and output circuits. The secondary winding includes two end terminals respectively connected to first and second switching circuits, which are in turn connected to a common node. The secondary winding also has a mid terminal. A filter circuit is disposed between the mid terminal and the common node. The first and second switches are controlled by complementary control circuits which, through proper timing, selectively allow current to orderly pass through the filter circuit via the switching circuits during the forward rectification, resetting, and freewheeling operational modes of the power converter. As arranged, the different current flows during the aforementioned modes are properly directed and efficiently utilized.

These and other features and advantages of the invention will be apparent to those skilled in the art from the following detailed description, taken together with the accompanying drawings, in which like reference numerals refer to like parts.

BRIEF DESCRIPTION OF DRAWINGS

FIG. 10 is a corresponding logic chart of FIG. 8;

DETAILED DESCRIPTION

Figure 1:
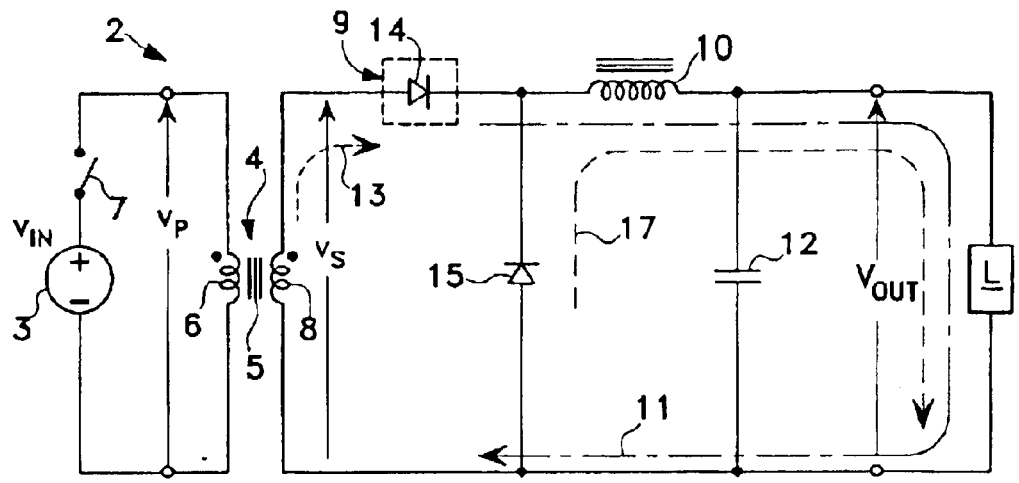
FIG. 1 is a schematic drawing of a known switching-mode power conversion circuit.
Figure 2:
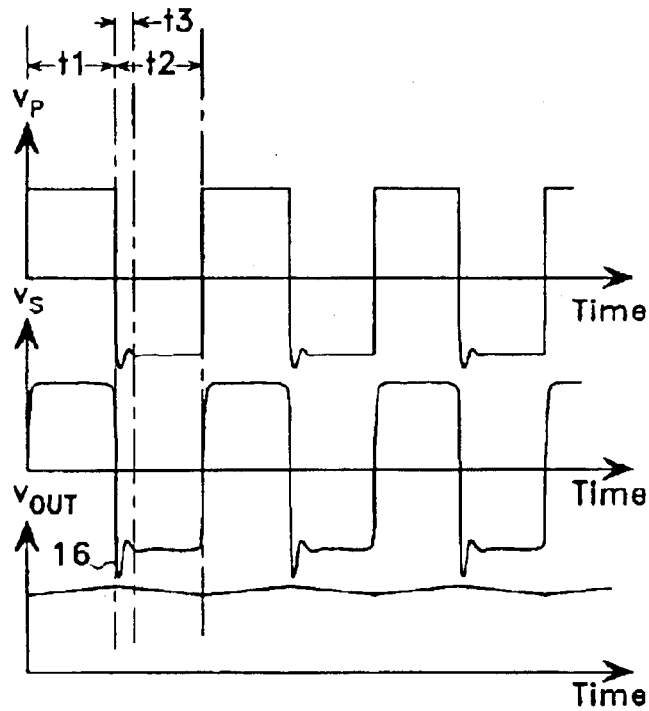
FIG. 2 is a timing diagram illustrating the waveforms of the known circuit shown in FIG. 1.
Figure 3:
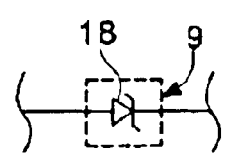
FIG. 3 is a variation of the rectifying circuit used in the power conversion circuit of FIG. 1.
Figure 4:
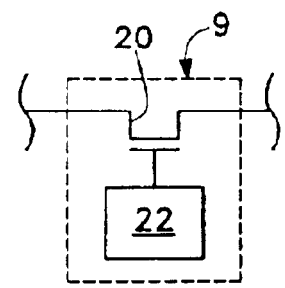
FIG. 4 is another variation of the rectifying circuit used in the power conversion circuit of FIG. 1.
Figure 5:
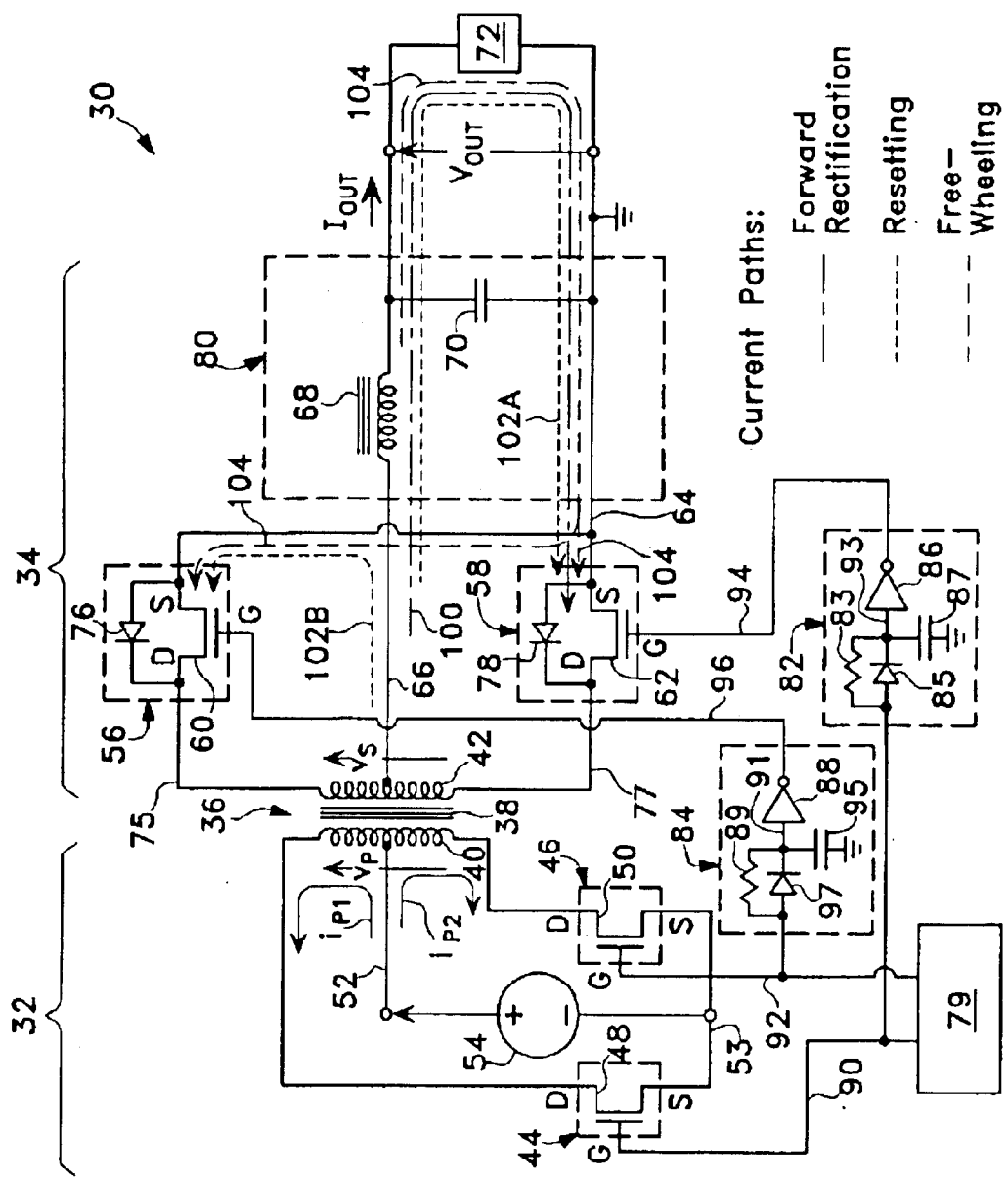
FIG. 5 is a schematic drawing showing a first embodiment of the invention.

Reference is now directed to FIG. 5 which shows a first embodiment of the invention generally signified by the reference numeral 30. Specifically, this embodiment is a full-wave DC-to-DC converter having an input circuit section 32 and an output circuit section 34. Disposed between the input and output circuit sections 32 and 34 is a transformer 36 having a core 38. There are primary and secondary windings 40 and 42 wound around the core 38. The input and output circuits 32 and 34 are respectively coupled to the primary and secondary windings 40 and 42.

The input circuit 32 includes first and second switches 44 and 46. In this embodiment first and second switches 44 and 46 are respectively n-channel FETs (Field Effect Transistors) 48 and 50. Each of the FETs 48 and 50 has a source S, a gate G and a drain D. The sources S of the FETs 48 and 50 are tied together at the node 53. The drain D of the first FET 48 is connected to one terminal of the primary winding 40. The drain D of the second FET 50 is connected to the other terminal of the primary winding 40. There is also a DC power supply 54 having the positive and negative terminals respectively disposed across the center tap 52 of the primary winding 40 and the common connection 53 of the sources S of the FETs 48 and 50.

The output circuit 34 has first and second switching circuits 56 and 58. In this embodiment, switching circuits 56 and 58 also respectively include FETs 60 and 62 with each having a source S, a gate G, and a drain D. Also, disposed in the switching circuits 56 and 58 are body diodes 76 and 78, respectively, connected to the drains D and sources S of the FETs 60 and 62. The drain D of the FET 60 is connected to one terminal 75 of the secondary winding 42. The drain D of the FET 62 is connected to the other terminal 77 of the secondary winding 42. The sources S of the two FETs 60 and 62 are linked together at a common node 64. The secondary winding 42 is center-tapped at the node 66 which is tied to one end of a filter inductor 68. There is a filter capacitor 70 connected to the other end of the filter inductor 68 and the node 64. In this embodiment, the inductor 68 and the capacitor 70 together constitute a filter circuit 80. In operation, a load 72 is attached across the two terminals of the capacitor 70, as shown in FIG. 5.

The first and second switches 44 and 46 are controlled by a switching control circuit 79. Specifically, in this case, the gates G of the first and second FETs 48 and 50 are tied together and driven by the switching control circuit 79.

In this embodiment, disposed between the first switch 44 and the second switching circuit 58 is a first complementary control circuit 82. In particular, the first complementary control circuit 82 includes an inverter 86 having an input 93 tied to a pair of resistor 83 and diode 85 connected in parallel. There is also a capacitor 87 which has one end connected to the input 93 of the inverter 86 and the other end connected to the ground terminal. The anode of the diode 85 is linked to the gate G of the FET 48. The output of the inverter 86 goes to the gate G of the FET 62. Likewise, a second complementary control circuit 84 is disposed between the second switch 46 and the gate G of the first switching circuit 56. The second complementary control circuit 84 includes another inverter 88 having an input 91 connected to another pair of resistor 89 and diode 97 connected in parallel. There is also a capacitor 95 which has one end connected to the input 91 of the inverter 88 and the other end connected to the ground terminal. The anode of the diode 97 is tied to the gate G of the FET 50. The output of the inverter 88 is routed to the gate G of the FET 60.

Figure 6:
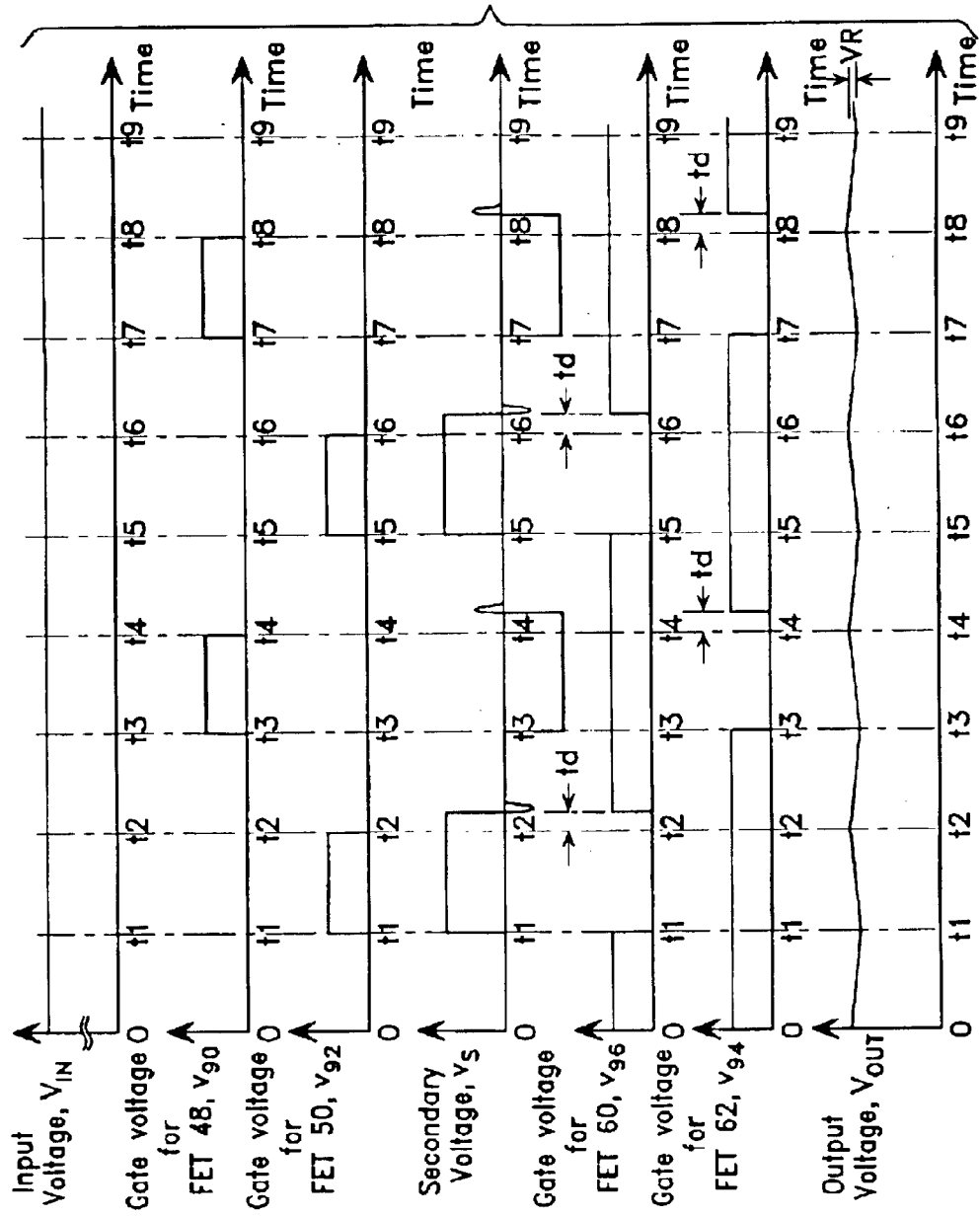
FIG. 6 is a timing diagram illustrating the waveforms of the power conversion circuit of the first embodiment shown in FIG. 5.

The operation of the first embodiment 30 is herein described by referring to the timing diagram of FIG. 6 in conjunction with FIG. 5.

Suppose the power supply 54 supplies a DC voltage $V_{IN}$. The switching control circuit 79 having two outputs which supply time-varying signals $v_{90}$ and $v_{92}$ at the nodes 90 and 92, respectively, as shown in FIG. 5. Hereinafter, any voltage or current symbol with an accompanying number as a subscript denotes the voltage or current value at the node identified by the subscript. Thus, for example, $v_{90}$ denotes the voltage value at the node 90.

At the time from t=t1 to t=t2, the control circuit 79 provides a positive pulse $v_{92}$ to the gate G of the FET 50. The voltage $v_{90}$ is still at a low voltage level. Consequently, the FET 50 is turned on and the FET 48 is turned off. As a result, a primary current $i_{P2}$ flows from the power supply 54 to the primary winding 40 via the turned-on FET 50, as shown in FIG. 5. Depending on the winding ratio of the transformer, a secondary voltage $v_S$ of certain magnitude is induced at the secondary winding 42. How the secondary current in the output circuit 34 flows depends on the conduction states of the switching circuits 56 and 58.

Attention is now directed to the complementary control circuits 82 and 84 shown in FIG. 5. At the time t=t1, the switching control circuit 79 switches the node 92 from low to high, while maintaining the potential at the node 90 at low. The high voltage $v_{92}$ at the node 92 charges the capacitor 95 in the secondary complementary circuit 84 via the diode 97, resulting in a high voltage level at the input 91 of the inverter 88. Consequently, the output 96 of the inverter 88 is inverted to a logic low state, thereby turning off the FET 60. The FET 60 remains off from the time t=t1 to t=t2. At the same time, since the node 90 is at the logic low state, the diode 85 in the first complementary circuit 82 is turned off. The input 93 of the inverter 86 is therefore also at the low voltage level resulting in the output 94 of the inverter 86 inverted to a logic high state. Thus, the FET 62 is turned on. The voltages $v_{94}$ and $v_{96}$, the respective gate voltages for the FETs 62 and 60, are shown in FIG. 6. As a result, the secondary current flows from the center tap 66 of the secondary winding 42 to the inductor 68 and the capacitor 70 via the turned-on FET 62. The current path is identified by the reference numeral 100. The circuit 30 is in the forward rectification mode.

At the onset of the time at t=t2 proceeding to the time t=t3, the control circuit 79 begins to shut off the FET 50 by providing a low voltage $v_{92}$ to the gate G of the FET 50. The FET 44 remains turned off. Ideally, the turning off of both FETs 48 and 50 shuts off any primary current $i_{P1}$ or $i_{P2}$ flowing in the primary winding 40, thereby resulting in no secondary current $i_S$ induced in the secondary winding 42. However, due to the switching delays of the FETs 48 and 50 coupled with the associated parasitic elements, the transition of the voltage potential $v_S$ of the secondary winding 42 is normally delayed by a short duration td, as shown in FIG. 6.

If the secondary complementary circuit 84 merely consists of the inverter 88 with no other components buffering at its input node 91, at the time t=t2, the inverter 88 would have almost instantaneously inverted the low signal at the input node 92 to a high signal at the output node 96, thereby turning on the FET 60. That is, at the time t=t2, both the FETs 60 and 62 would have been turned on, an undesirable condition called "cross conduction" could have occurred. Specifically, cross conduction is a scenario in which current intended to flow through the FET 62 in the forward rectification mode diverts into the unintentionally turned-on FET 60, and vice versa.

The resistor 89, the capacitor 95 and the diode 97, buffering at its input node 91 of the first complementary circuit 84 constitute an automatic delay mechanism for preventing cross conduction. Thus, at the time t=t2, when the switching control circuit 79 turns off the FET 50 by switching the node 92 from high to low, the diode 97 is reverse-biased and acts as an open circuit. Charges accumulated in the previous cycle in the capacitor 95 sluggishly discharges through the resistor 89. The RC (Resistance-Capacitance) time constant of the resistor 89 and the capacitor 95 can be chosen so as to be compatible with the delay time td. Thus, with proper design, at the time t=t2+td, the secondary voltage $v_S$ returns to the ground potential. At the same time, the FET 60 turns on. Cross conduction can thus be avoided.

At the time from t=t2+td to t=t3, both FETs 48 and 50 are turned off. The secondary voltage $v_S$ returns to zero. However, the FETs 62 and 60 are turned on. At this point in time, the stored energy in the transformer 36 begins to release itself due to the sudden cessation of secondary voltage $v_S$. At the same time, the secondary winding 42 which is an inductor, attempts to continue to maintain its original current flow. With both the FETs 60 and 62 turned on, a low-impedance path is thus provided for the release of the stored energy. The converter 30 is in the resetting mode. The direction of the current paths are respectively signified by the reference numerals 102A and 102B through the turned-on FETs 62 and 60, as shown in FIG. 5.

As mentioned before, the advantage of providing a low impedance path for the resetting current is two-fold. First, less Ohmic heat is generated resulting in higher operating efficiency of the circuit 30. Second, the resetting duration can be substantially shortened allowing more room for increase in the switching frequency of the switching control circuit 79.

Also immediately after the time t=t2+td, the stored energy in the inductor 68, which normally has a high inductive value, also releases itself. The inductor 68 attempts to maintain its original current flow. The current flow from the inductor 68, passes through the capacitor 70 and the load 72, and then branches out to the turned-on FETs 60 and 62. The current path is identified by the reference numeral 104 in FIG. 5. The circuit 30 is said to be in the freewheeling mode. Again, the simultaneously turned-on FETs 60 and 62 provide a low impedance freewheel current path with all the advantages as described above.

Entering the time period from t=t3 to t=t4, the control circuit 79 supplies a high voltage $v_{90}$ at the node 90 and a low voltage $v_{92}$ at the node 92. After processing through the inverters 88 and 86, the voltage levels at the nodes 94 and 96 are at low and high, respectively. Consequently, the FET 60 is turned on while the FET 62 is turned off. The voltages $v_{96}$ and $v_{94}$ the respective gate voltages for the FETs 60 and 62, are shown in FIG. 6. As a consequence, a secondary current flows from the center tap 66 of the secondary winding 42 to the inductor 68 and the capacitor 70 via the FET 60. The current path is identified by the reference numeral 100. The rectifier 30 is again in the forward rectification mode.

For the remaining time periods, the operation of the circuit 30 is substantially the same as described above. The delay mechanism which includes the resistor 83, the diode 85 and the capacitor 87 at the input 93 of the inverter 86 in the first complementary circuit 82 also operates in a similar manner during the time from t=t4 to t=t4+td as that of the secondary complementary circuit 84 during the time from t=t2 to t=t2+td. For the sake of brevity and conciseness, the operating details for the remaining time periods are not further repeated.

During the forward rectification mode, current from the secondary winding 42 charges up the capacitor 70 through the filtering inductor 68. During the freewheeling mode, current from the filter inductor 68, stored with energy from the previous half-cycle, continues to charge up the capacitor 70, albeit at a decaying fashion. The voltage across the capacitor 70 is the output voltage $V_{OUT}$ across the load 72. The waveform of $V_{OUT}$ is shown in FIG. 6. Superimposed with the output voltage $V_{OUT}$ is a ripple component VR. The magnitude of the ripple VR depends on the inductance and capacitance values of the respective inductor 68 and 70 in the filter circuit 80. In general, the larger the inductance and capacitance values of the respective inductor 68 and capacitor 70, the smaller is the ripple content superimposed on the output voltage $V_{OUT}$, and vice versa.

Figure 7:
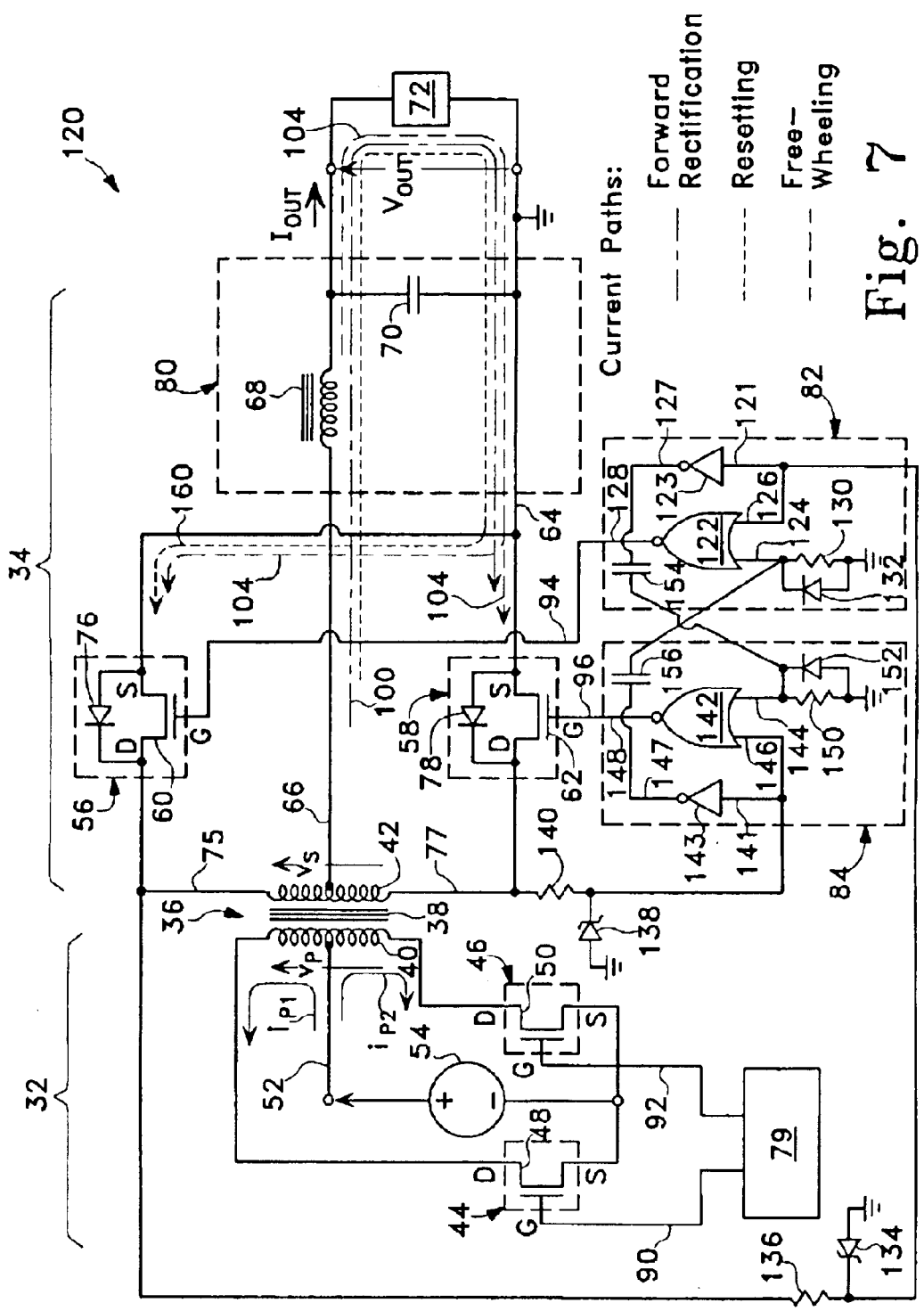
FIG. 7 Is a schematic drawing showing a second embodiment of the invention.

FIG. 7 shows a second embodiment of the invention signified by the reference numeral 120. There are substantial similarities between this embodiment 120 and the previous embodiment 30. Again, for the sake of conciseness, only the differences are herein highlighted.

Instead of an inverter, in each complementary control circuit 82 or 84, there is a NOR circuit included. Take the first complementary control circuit 82 as an example. The complementary control circuit 82 includes a NOR circuit 122 having inputs 124 and 126, and an output 128. There is a resistor 130 connected between the input 124 and the ground terminal. Connected with the resistor 130 in parallel is a diode 132. The cathode and anode of the diode 132 are tied to the input 124 and the ground terminal, respectively. There is also an inverter 123 tied parallel to the NOR circuit 122. The inputs 121 and 126 of the inverter 123 and the NOR circuit 122, respectively, are connected together. The output 127 of the inverter 123 drives the input 144 of the NOR circuit 142 through a capacitor 154.

In a similar manner, the complementary control circuit 84 includes another NOR circuit 142 having inputs 144 and 146, and an output 148. There is also a resistor 150 connected between the input 144 and the ground terminal. Connected with the resistor 150 in parallel is another diode 152. The cathode and anode of the diode 152 are tied to the input 144 and the ground terminal, respectively. Likewise, there is also an inverter 143 tied parallel to the NOR circuit 142. The inputs 141 and 146 of the inverter 143 and the NOR circuit 142, respectively, are connected together. The output 147 of the inverter 143 is disposed to drive the input 124 of the NOR circuit 122 through another capacitor 156.

As different from the previous embodiment 30 where the complementary control circuits 82 and 84 accept input signals from the input circuit 32, the complementary control circuits 82 and 84 of this embodiment 120 accept input signals from the output circuit 34. Specifically, the input 126 of the first complementary circuit 82 is tied to one end 75 of the secondary winding 42. Likewise, the input 146 of the second complementary circuit 84 is connected to the other end 77 of the secondary winding 42. The outputs 128 and 148 of the complementary circuits 82 and 84 drive the gates G of the FETs 60 and 62, respectively.

Attached to the input 126 of the NOR circuit 122 is the cathode of a Zener diode 134. The anode of the Zener diode 134 is tied to the ground terminal. Disposed between the input node 126 and the secondary winding terminal 75 is a resistor 136. The Zener diode 134 and the resistor 136 serve the signal clamping function at the input 126 and will be explained further later. In a similar manner, another Zener diode 138 is attached across the input 146 of the NOR circuit 142 and the ground terminal. Another resistor 140 is also inserted between the NOR input 146 and the secondary winding terminal 77.

Figure 8:
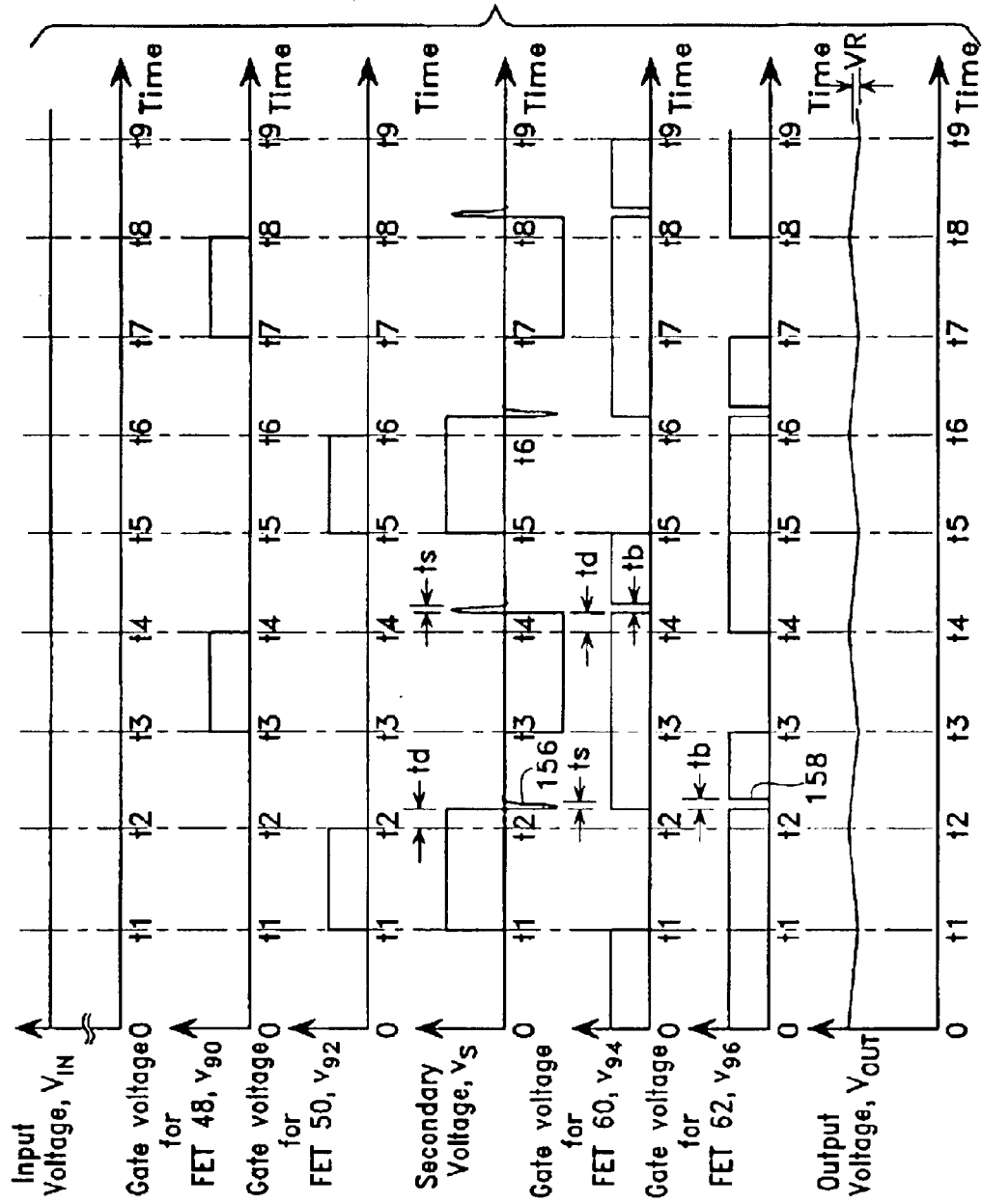
FIG. 8 is a timing diagram illustrating the waveforms of the power conversion circuit of the second embodiment shown in FIG. 7.
Figure 9:
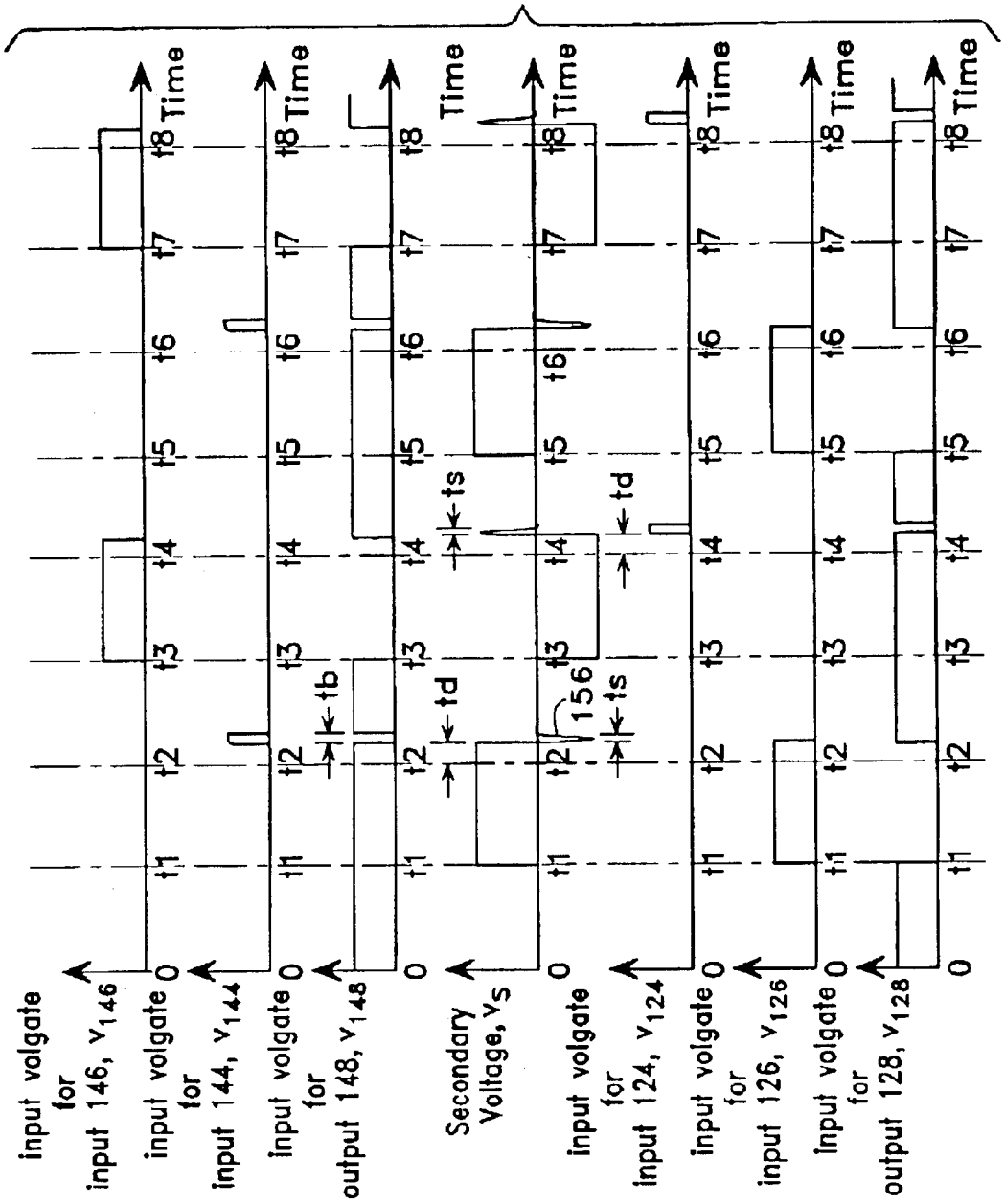
FIG. 9 is a timing diagram of the complementary circuits used in the circuit of FIG. 7 during various modes of operation.

The operation of the this embodiment is herein described by referring to FIG. 7 in conjunction with FIGS. 8–10.

Suppose the power supply 54 supplies a DC voltage $V_{IN}$. The control circuit 79 supplies two time-varying signals $v_{90}$ and $v_{92}$ at the nodes 90 and 92, respectively. At the time from t=0 to t=t1, both $v_{90}$ and $v_{92}$, which are respectively the gate voltages at the FETs 48 and 50, are at low potential. Both FETs 48 and 50 are thus turned off. There is no primary current $i_P$ flowing through the primary winding 40. As a consequence, no secondary voltage $V_S$ is induced across the secondary winding 42. The terminal nodes 75 and 77 of the secondary winding 42 are thus at the ground potential. After passing through the inverters 143 and 123, the respective output nodes 147 and 127 are at high potential. However, the capacitors 156 and 154 act as open circuits for the DC voltage levels at the nodes 147 and 127. Consequently, the input nodes 144 and 124 are pulled to the ground potential through the respective resistors 150 and 130. The terminal nodes 75 and 77 are also tied to the input nodes 126 and 146, respectively. Therefore, the inputs 144 and 146 of the NOR circuit 142 are at low potential. Likewise, the inputs 124 and 126 of the NOR circuit 122 are also at low potential. As a consequence, the outputs 128 and 148 are inverted to logical high, thereby turning both the FETs 60 and 62 on.

At the time from t=t1 to t=t2, the control circuit 79 provides a positive pulse $v_{92}$ to the gate G of the FET 50. The voltage $v_{90}$ is still at a low voltage level. Consequently, the FET 50 is turned on and FET 48 is turned off. As a result, a primary current $i_{P2}$ flows from the power supply 54 to the primary winding 40 via the turned-on FET 50, as shown in FIG. 7. The flow of primary current $i_{P2}$ induces a secondary voltage $v_S$ in the secondary winding 42. The potentials at the nodes 75 and 77 are respectively at the high and low levels.

Attention is now directed to the NOR circuit 122. After the time t=t1, the input node 124 stays at low. The switching of the winding terminal node 75, which is tied to the input node 126, from a low state to a high state at the time from t=t1 to t=t2 inverts the output 128 of the NOR circuit 122 from a high state to a low state. At the same time, the output 127 of the inverter 123 is also inverted to a low state. The low state at the output node 127 of the inverter circuit 123 forward biases the diode 152, and at the same time, the capacitor 152 which was initially charged now discharges through the forward-biased diode 152. After the discharge, the input 144 of the NOR circuit 142 sits at a forward diode drop below the ground potential, which is still a logically low state. With the node 128 switched to low as explained before, since the node 128 is tied to the node 94, the voltage $v_{94}$ drops to a low level thereby turning off the FET 60. There is no voltage level change at the node 96 because there is no switching at the output 148 of the NOR circuit 142 and the FET 62 remains turned on. Consequently, a secondary current flows from the center tap 66 of the secondary winding 42 to the inductor 68 and the capacitor 70 via the FET 62. The current path is identified by the reference numeral 100 as shown in FIG. 7. The circuit 120 is in the forward rectification mode.

At the time t=t2, the switching control circuit 79 supplies a low voltage level $v_{92}$ at the node 92, and the voltage level $v_{90}$ at the node 90 remains low. Both the FETs 48 and 50 are turned off. No primary current $i_{P1}$ or $i_{P2}$ flows in the primary winding 40 and no secondary voltage $v_S$ should be induced. However, as mentioned before, the switching delays of the FETs 48 and 50 coupled with the associated parasitic elements delay the fall of the secondary voltage $v_S$ from returning to zero. The transition of the winding terminal 75 from high to low at the time t=t2+td is shown in FIG. 8 in which the time delay is identified as td.

At the time t=t2+td, the fall of the voltage level at the winding terminal node 75 pulls the corresponding voltage level of the input node 126 of the NOR circuit 122 from a high to a low value. The output level of the node 128 of the NOR circuit 122 thus depends on the logic state at the input node 124.

Prior to the time t=t2+td, the node 124 sits at low. Since the input node 124 of the NOR circuit 122 is tied to the output node 147 of the inverter 143 through the capacitor 156, depending on the values of the capacitor 156 and the resistor 130, the node 124 could be momentarily switched to high if the output node 147 switches from low to high. However, the RC time constant of the resistor 130 and capacitor 156 is chosen to be small in comparison to the switching cycles generated by the switching control circuit 79. Thus, even if the node 147 switches from low to high, with the relatively small time constant RC at the node 147, the node 147 swiftly settles at the high level. After the voltage level at the node 147 is settled, the capacitor 156 acts like an open circuit. As such, the node 124 is then immediately pulled to the ground potential via the resistor 130. Differently put, the input node 124 more or less stays at low before and after t=t2+td, irrespective of the voltage levels at the output node 147. Thus, with both input nodes 124 and 126 of the NOR circuit 122 at low logic levels, the output 128 switches to logic high after t=t2+td.

Reference is now directed to the secondary complementary control circuit 84. At the time t=t2+td, the secondary voltage $v_S$ falls. The secondary winding terminal 75 switches from high to low. Since the input 121 of the inverter 123 is tied to the secondary winding terminal 75, the output 127 of the inverter 123 accordingly switches from low to high. In a similar manner as previously described, the RC time constant of the resistor 150 and the capacitor 154 is also chosen to be small in comparison to the switching cycles. The switching from low to high at the node 127 at t=t2+td swiftly impinges on the input node 144 of the NOR circuit 142. Again, the output level of the node 148 depends on the logic state at the other input 146.

Prior to the time t=t2+td, the node 146 stays at low. At the same time t=t2+td, the secondary voltage $v_S$ falls. In accordance with Lenz'saw, the secondary winding 42 reacts with a voltage having an opposite polarity in response to the withdrawal of the secondary voltage $v_S$, in the form of a spike 156 as shown in FIG. 8. However, at the secondary winding terminal 77, there is the Zener diode 138 attached. Any spike going in the negative polarity at the cathode of the Zener diode 138 will be clipped by the forward conducting Zener diode drop. Thus, the spike 156 will be clamped as a clipped pulse with an amplitude equals to the forward Zener diode drop in the negative polarity. The clipped pulse at the input 146 is insufficient to reach the logic high level and thus, the node 146 stays at low after the time t=t2+td.

Attention is now returned to the input node 144 of the NOR circuit 142. As mentioned before, the output 127 of the inverter circuit 123 switches from low to high at the time t=t2+td. Through the RC path from the capacitor 154 and the resistor 150, the input node 144 also switches from low to high. However, as also mentioned before, The RC path with the capacitor 154 and the resistor 150 has a comparatively small RC time constant, resulting in the node 127 swiftly settles at the high voltage level. Thereafter, the capacitor 154 acts like an open circuit. The node 144 is immediately pulled to the ground potential through the resistor 150. Consequently, the resultant signal at the node 144 manifests itself as a short duration pulse with a pulse width tb as shown in FIG. 8. With the other input 146 sifting at low, the output 148 of the NOR circuit 142 generates a low-going pulse also with a pulse width tb.

In this embodiment, the low-going pulse with the pulse width tb at the output 148 of the NOR circuit 142 serves the function of temporarily shutting off the FET 62 during the resetting mode. Consequently, the resetting current is channeled for constructive use, as described below.

In the same manner as in the previous embodiment, The sudden withdrawal of the secondary voltage $v_S$ at the secondary winding 42 during the time t=t2+td to t=t2+td+ts provokes the winding 42 to respond with a spike 156 of the opposite polarity. At the same time, the winding 42 attempts to maintain current continuity by releasing magnetic energy stored in the previous half-cycle. The circuit 120 at this juncture is said to be at the resetting mode. If during this time, both FETs 60 and 62 are turned on, the winding 42 basically has a equivalent short circuit, with the two terminals 75 and 77 shorted together. In reality, there exists certain degree of impedance and the resetting current will circulate through the winding 42 and the two turned-on FETs 60 and 62 and thereafter gradually dissipates away through the circuit impedance. To bypass such an event from occurring, the blanking pulse with the pulse width tb impinging at the gate G of the FET 62 during the time from t=t2+td to t=t2+td+tb shuts off the FET 62. As such, the resetting current flows from the center-tapped node 66 to the inductor 68, the capacitor 70 and the load 72, and passes through the turned-on FET 60. Thereafter, the resetting current returns back to the secondary winding 42 via the node 75. The resetting current path is signified by the reference numeral 160 as shown in FIG. 7.

Thus, instead of dissipatively wasted, the resetting current is channeled to the load 72 as load current $I_{OUT}$ for constructive use. The re-channeled resetting current blends into the freewheeling current which arises during the freewheeling mode as described below.

After the time t=t2+td+tb, the output node 148 of the NOR circuit 142 bounces back to high and turns the FET 62 back on. At this time, after the discharge of the resetting current, both the FETs 60 and 62 are turned on. The stored energy in the filtering inductor 80 discharges as freewheel current flowing from the inductor 68 to the capacitor 70 and the load 72, then branches out to the two turned-on FETs 60 and 62. The freewheel current path is identified by the reference numeral 104 as shown in FIG. 7.

From the time t=t3 to t=t5, the operation of the circuit 120 is substantially similar to the operation from the time t=t1 to t=t3, except the polarities of the various voltages are reversed. For the sake of conciseness, the operation during these time periods is not further repeated. The timing diagram of the NOR circuits 122 and 142 is shown in FIG. 9. The corresponding logic states of the NOR circuits 122 and 142 are shown in FIG. 10.

It should be noted that in this embodiment, cross-conduction is no longer a concern because the FETs 60 and 62 are turned on and off by sensing signals from the secondary winding 42 directly. For instance, from the time t=t1 to t2, the circuit 120 is in the forward rectification mode. At the end of the forward rectification mode at the time t=t2+td, the secondary winding terminal 77, which is tied to the input node 126 of the NOR circuit 122 switches from high to low and thus shuts off the FET 60. Thus, there is no simultaneous turning on of both FETs 60 and 62. Likewise, the same holds true from the time t=t4+td after the half-cycle from t=t3 to t=t4.

Figure 11:
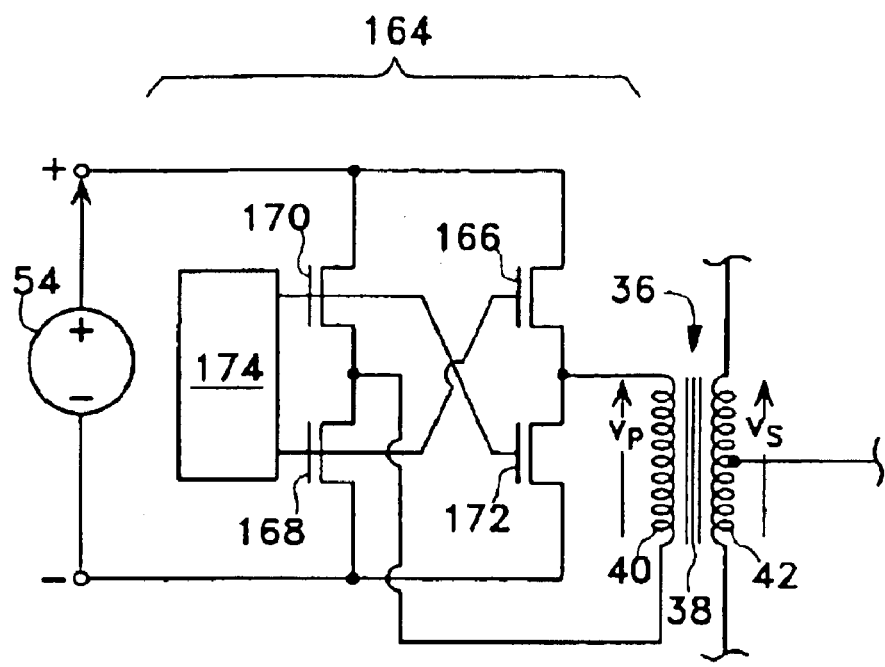
FIG. 11 is a schematic drawing showing a variation of the implementation of the invention.

Finally, other changes are possible within the scope of the invention. Described in the embodiments 30 and 120, the input circuit 32 is depicted as a full-wave switching circuit. It is possible that the input circuit 32 can be slightly modified as an input circuit 164 which is a full-bridge switching circuit as shown in FIG. 11. In the input circuit 164, it includes four FET switches 166, 168, 170 and 172 controlled by a control circuit 174. During the time period from t=t1 to t=t2 (FIGS. 6 and 8), FETs 166 and 168 are turned on while FETs 170 and 172 are turned off. Conversely, during the time period from t=t2 to t=t3 (FIGS. 6 and 8), FETs 166 and 168 are turned off while FETs 170 and 172 are turned on. The resultant secondary voltage $v_S$ across the secondary winding 42 of the transformer 36 is the same as that of the previous embodiments shown in FIGS. 6 and 8.

Figure 12:
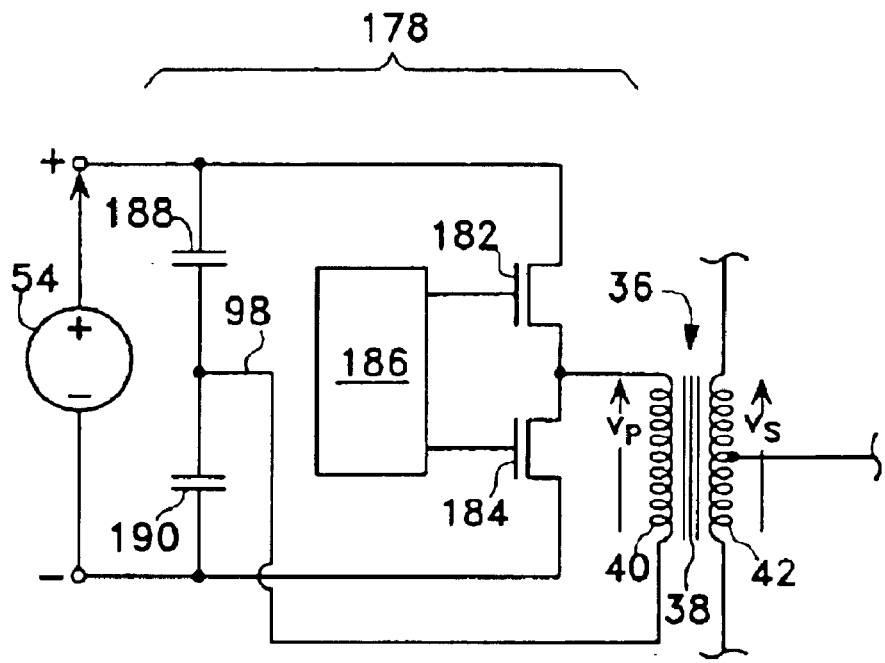
FIG. 12 is a schematic drawing showing another variation of the implementation of the invention.

It is also conceivable that the input circuit 32 can be implemented as an input circuit 178 having a half-bridge topology as shown FIG. 12. The input circuit 178 includes two FET switches 182 and 184 controlled by a control circuit 186. There are also two capacitors 188 and 190 connected in series. The common connection point 98 of the capacitors 188 and 190 is tapped to one terminal of the primary winding 38. The capacitors 188 and 190 provide a mid reference voltage point for the primary voltage $v_P$. During the time period from t=0 to t=t1 (FIGS. 6 and 8), the FET 182 is turned on while the FET 184 is turned off. Conversely, during the time period from t=t1 to t=t2 (FIGS. 6 and 8), the FET 182 is turned off but the FET 184 is turned on. The resultant secondary voltage $v_S$ across the secondary winding 42 of the transformer 36 is the same as that of the previous embodiments.

Figure 13:
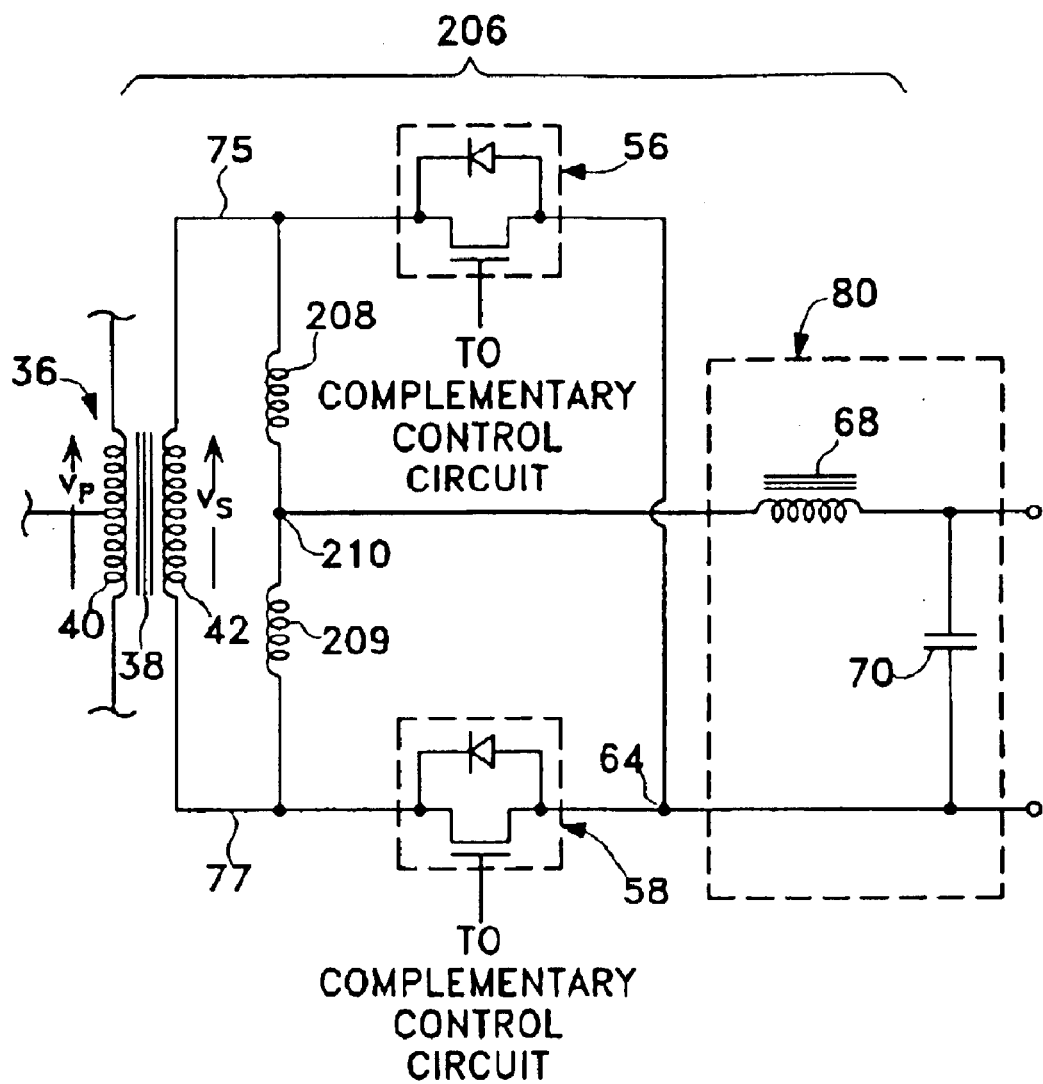
FIG. 13 is a schematic drawing showing yet another variation of the implementation of the invention.

It is also possible that the output circuit 34 can be modified as a current-doubler circuit 206 shown in FIG. 13. The output circuit 206 comprises two coils 208 and 209 joined at a node 210. The coils 208 and 209 are connected in series and are disposed across the secondary winding 42 at the respective winding terminals 75 and 77. The coils 208 and 209 are also tied to the respective switching circuits 56 and 58, which are in turn connected to a common node 214. The filer circuit 80 is connected between the nodes 210 and 64. During the forward rectification mode at the positive half-cycle of the secondary voltage $v_S$, current flows from the winding terminal 75, passing through the inductor 208, the node 210, the filter inductor 68, the capacitor 70, the switching circuit 58 and to the node 77. In a similar manner, at the negative half-cycle, current flows from the winding terminal 77, passing through the inductor 209, the node 210, the filter inductor 68, the capacitor 70, the node 214, the switching circuit 56 and to the node 75. Since the secondary current $i_S$ is proportional to the number of winding turns in the secondary winding 42, the magnitude of the secondary current $i_S$ can thus be increased during the forward rectification mode because of the practical increase of winding turns by the presence of the coils 208 and 209. The other modes of operation of the circuit 206 are substantially the same as the previous embodiments and are thus not further repeated.

Furthermore, all the switches described in the embodiments involve the use of FETs. It certainly is feasible that other kinds of switches can be used, such as bipolar transistors, or IGBTs (Insulated Gate Bipolar Transistors). It will be understood by those skilled in the art that these and other changes in form and detail may be made therein without departing from the scope and spirit of the invention.

What is claimed is:

1. A switching-mode power converter comprising:

input and output circuits;

a transformer having primary and secondary windings respectively coupled to said input and output circuits, said secondary winding includes first, second and mid terminals, said primary winding includes third and forth terminals;

first and second switching circuits, each of said switching circuits having one end coupled to one of said first and second terminals of said secondary winding and an other end connected to a common node;

third and fourth switching circuits respectively coupled to said third and fourth terminals of said primary windings;

a filter circuit having an inductor and a capacitor connected in series, said inductor being connected to said mid terminal of said secondary winding, and said capacitor being connected to said common node; and first and second complementary control circuits respectively disposed to drive said first and second switching circuits, said first complementary control circuit being disposed between said first and third switching circuits, and said second complementary control circuit being disposed between said second and fourth switching circuits, each of said complementary control circuits includes an inverter circuit having an inverter input, a resistor and a diode connected in parallel disposed at said inverter input, said inverter circuit further including a capacitor disposed at said inverter input.

* * * * *